July 1, 1947.　　　L. T. SACHTLEBEN　　　2,423,256
MONITORING SYSTEM FOR OPTICAL SOUND RECORDING
Filed Dec. 22, 1943
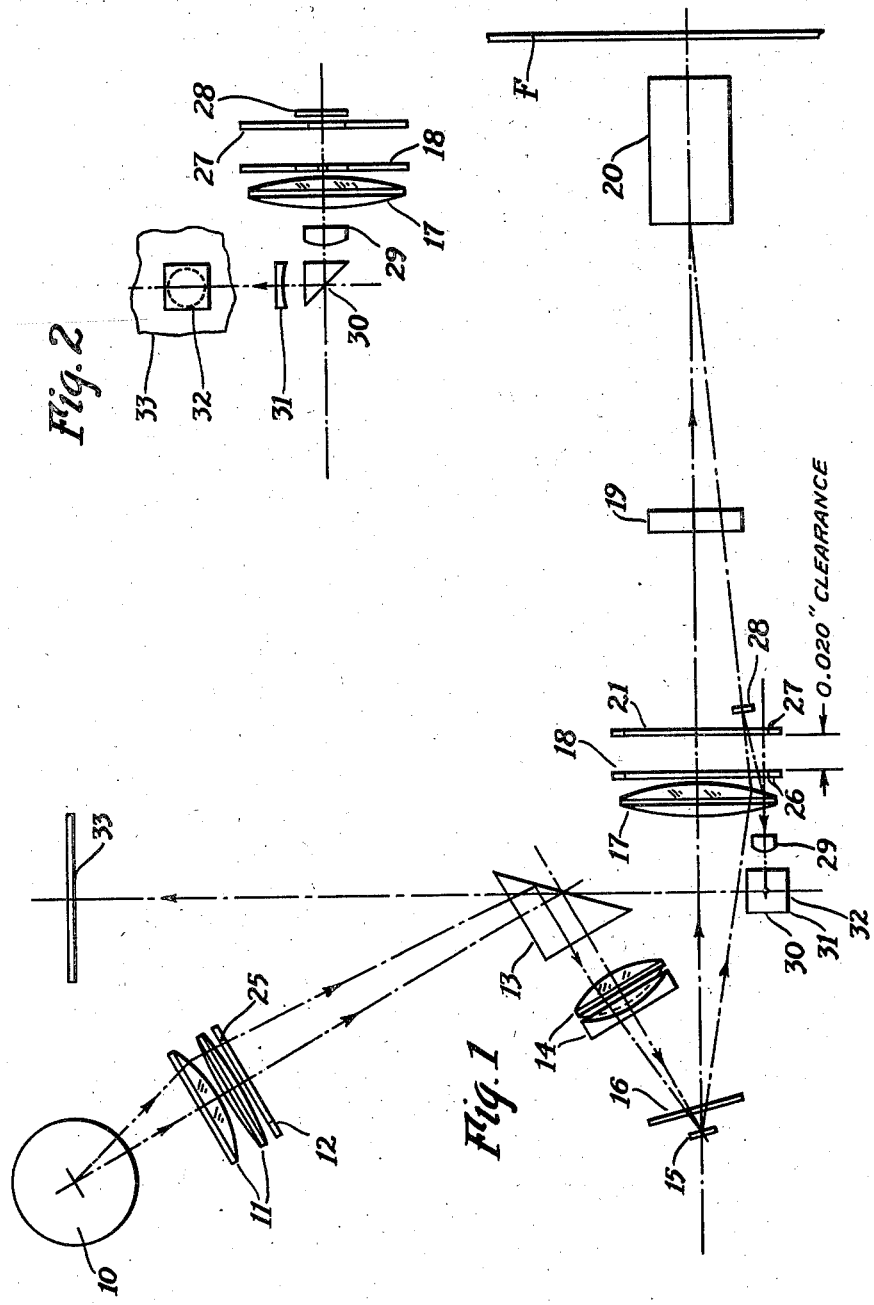
Inventor
Lawrence T. Sachtleben
By
Attorney Patented July 1, 1947

2,423,256

UNITED STATES PATENT OFFICE 2,423,256

MONITORING SYSTEM FOR OPTICAL SOUND RECORDING

Lawrence T. Sachtleben, Indianapolis, Ind., assignor to Radio Corporation of America, a corporation of Delaware Application December 22, 1943, Serial No. 515,219

15 Claims. (Cl. 179—100.3)

This invention relates to a monitoring system for visually indicating the amplitude of the modulation and the amplitude of the ground noise reduction in a sound recording optical system of the galvanometer type.

In optical systems of the galvanometer type where the galvanometer moves the image of an aperture over a slit, it is desirable to have a visual image of the operation of the device apparent to the operator of the apparatus. In the present apparatus the monitoring system is designed for operation with a ground noise reduction shutter adjacent the slit on which the aperture is imaged.

One object of the invention is to provide an improved visual monitoring device.

Another object of the invention is to provide a visual monitoring device which can be used with the ground noise reduction shutter adjacent the slit.

Another object of the invention is to provide a visual monitoring device which can be used with substantially any type of variable area recording optical system.

Another object of the invention is to provide a visual monitoring device which can be used with substantially any type of galvanometer recording optical system.

Other and incidental objects of the invention will be apparent to those skilled in the art by a reading of the following specification and an inspection of the accompanying drawings in which:

Figure 1 is a schematic plan view of my improved monitoring system in conjunction with a sound recording optical system, and Figure 2 is an elevation from the side of Fig. 1 and looking along the optical axis 32—33.

The optical system to which my improved monitoring system is shown applied comprises an exciter lamp 10, condenser lens system 11 condensing the light from the exciter lamp on to the aperture plate 12, a right-angle reflecting prism 13 deviating the light beam 90°, and a spaced crown and flint intermediate objective 14 which, with the condenser 11, focuses an image of the exciter lamp filament 10 on the galvanometer mirror 15 which is covered by cover glass 16. The intermediate objective 14 and the condenser 17 focus the image of the apertures in the aperture plate 12 on to the slit plate 18, and light passing through the slit in the slit plate goes through the ultra-violet filter 19 and the image of the slit in the plate 18 is focused by the objective 20 on the film F. This optical system is more fully described and claimed in my application, Serial No. 514,225, filed December 14, 1943. The aperture plate 12, in addition to the usual sound recording aperture, has an aperture at 25 substantially .020" in width, extending vertically, and of appropriate length. The ground noise reduction shutter is indicated at 21 and moves up and down across the slit in the plate 18 in accordance with the above ground noise reduction required as described in Patent No. 2,199,621. In the slit plate 18 there is a vertical slit indicated at 26 and in the ground noise reduction shutter 21 there is a corresponding vertical slit indicated at 27. Just beyond the ground noise reduction shutter 21 there is a narrow vertical reflector 28. The space between the slit plate 18 and the ground noise reduction shutter, and between the ground noise reduction shutter and the mirror 28, are shown greatly enlarged in the drawings. The aperture 25 is so arranged in the aperture plate 12 that the image of the aperture 25 will be sharply focused by the lenses 14 and 17 on the mirror 28. This may be accomplished by making the plate 12 of a substantial thickness and chamfering the edges of the apertures so that the main sound recording aperture is formed on one side of the plate and the aperture 25 is formed on the other side of the plate or by making the plate 12 relatively thin and of such a shape that the aperture 25 will be sharply focused on the mirror 28. The mirror 28 reflects the light back through the apertures 27 and 26 and through the edge of the lens 17 to the objective 29. This objective 29 images the reflected image on the screen 33 through, referring to Fig. 2, the reflecting prism 30, the concave lens 31, and the reflecting prism 32, which are shown in vertical alignment in Fig. 1. It will be apparent that the optical axis of the reflected beam is shifted vertically by the reflecting prisms 30 and 32 so that it completely clears the intervening elements of the main optical system, such, for example, as the reflecting prism 13, and it clears also any tubes or casings housing the main optical system.

Light from the aperture 25 reaches the galvanometer mirror 15 where the beam is vibrated in accordance with the sound being recorded. This vibrating beam of light passes through the aperture 26 and the aperture 27 to the mirror 28 and is returned through the aperture 27. The aperture 27 continuously cuts off one end of the beam of light in accordance with the movement of the ground noise reduction shutter 21 and the other end of the beam of light falls continuously on the mirror 28 in accordance with the movements of the galvanometer 15. The remaining portion of this beam of light is focused by the objective 29 on the screen or card 33. The reflecting prism 30 reflects the beam to a vertical direction and the reflecting prism 32 reflects again to a horizontal direction with the image of the aperture 25 in a horizontal position on the card 33. The image appears on the screen 33 as a narrow rectangle of light approximately .100" high by 1.000" long, modulation being indicated by horizontal movements of one end of this image, and noise reduction action by independent horizontal movements of the other end. Appropriate marks are placed on the card 33 indicating the stationary positions of the light beam and the limits of proper modulation, both of the ground noise reduction shutter and of the galvanometer with as many other indicia as may be appropriate to determine the positions therebetween.

It will be apparent that the mirror 28 may be mounted on the ground noise reduction shutter 21 instead of being placed therebehind, but it is desirable to use a stationary mirror and an aperture in the shutter so as to decrease the weight of the shutter rather than increasing it.

I claim as my invention:

1. A sound recording optical system including an aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, and an aperture in the slit plate through which the image of the narrow aperture is transmitted through the slit plate.

2. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, and an aperture in the slit plate through which the image of the narrow aperture is transmitted through the slit plate.

3. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, and an aperture in the slit plate through which the image of the narrow aperture is transmitted through the slit plate.

4. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, and mirror means adjacent the ground noise reduction mask for reflecting the image of the narrow aperture in the aperture plate as modified by the movements of the galvanometer and as modified by the movements of the ground noise reduction mask.

5. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, and mirror means at the ground noise reduction mask for reflecting the image of the narrow aperture in the aperture plate as modified by the movements of the galvanometer and as modified by the movements of the ground noise reduction mask.

6. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, and mirror means at the ground noise reduction mask for reflecting the image of the narrow aperture in the aperture plate as modified by the movements of the galvanometer and as modified by the movements of the ground noise reduction mask.

7. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, and mirror means adjacent the ground noise reduction mask for reflecting the image of the narrow aperture in the aperture plate as modified by the movements of the galvanometer and as modified by the movements of the ground noise reduction mask.

8. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen.

9. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen.

10. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen, the said optical system including an objective lens for imaging the slit on the screen and at least one right-angled reflecting prism for moving the optical axis of the reflected image out of the planes of the optical axis of the recording optical system.

11. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen, the said optical system including an objective lens for imaging the slit on the screen and at least one right-angled reflecting prism for moving the optical axis of the reflected image out of the planes of the optical axis of the recording optical system.

12. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen, the said optical system including an objective lens for imaging the slit on the screen and two right-angled reflecting prisms for moving the optical axis of the reflected image out of the planes of the optical axis of the recording optical system and for shifting the image of the narrow aperture into a horizontal plane.

13. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, and an optical system for projecting the reflected image on a screen, the said optical system including an objective lens for imaging the slit on the screen and two right-angled reflecting prisms for moving the optical axis of the reflected image out of the planes of the optical axis of the recording optical system and for shifting the image of the narrow aperture into a horizontal plane.

14. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate laterally spaced from the recording aperture of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, an optical system for projecting the reflected image on a screen whereby the monitoring image appears on the screen as a narrow horizontal rectangle of light, modulation being indicated by horizontal movement of one end of this image and noise reduction action by independent horizontal movement of the other end of the image.

15. A sound recording optical system including an illuminated aperture plate having an aperture therein, a slit plate having a narrow slit therein, a galvanometer adapted to move an image of the aperture in the aperture plate over the slit in the slit plate in accordance with the recorded sound, a narrow additional aperture in the aperture plate of which an image is moved over the slit plate by the galvanometer, an aperture in the slit plate through which the image of the narrow aperture is transmitted through the slit plate, a ground noise reduction mask adjacent the slit plate, mirror means adjacent the ground noise reduction mask for reflecting the image of the narrow aperture in the aperture plate as modified by the movements of the galvanometer and as modified by the movements of the ground noise reduction mask, an optical system for projecting the reflected image on a screen, the said optical system including an objective lens for imaging the slit on the screen and two right-angled reflecting prisms for moving the optical axis of the reflected image out of the planes of the optical axis of the recording optical system and for shifting the image of the narrow aperture into a horizontal plane, whereby the monitoring image appears on the screen as a narrow horizontal rectangle of light, modulation being indicated by horizontal movement of one end of this image and noise reduction action by independent horizontal movement of the other end of the image.

LAWRENCE T. SACHTLEBEN.

REFERENCES CITED

The following references are of record in the file of this patent:

UNITED STATES PATENTS

| Number | Name | Date |
|---|---|---|
| 2,220,198 | Batsel | Nov. 5, 1940 |
| 2,206,645 | Sachtleben | July 2, 1940 |
| 2,166,185 | Stack | July 18, 1939 |
| 2,270,350 | Schomacker | Jan. 20, 1942 |
| 2,318,138 | Benfer | May 4, 1943 |
| 2,102,778 | Hasbrouck | Dec. 21, 1937 |
| 2,102,776 | Baker | Dec. 21, 1937 |
| 2,102,777 | Baker | Dec. 21, 1937 |